(12) United States Patent
Guo et al.

(10) Patent No.: US 11,657,011 B2
(45) Date of Patent: May 23, 2023

(54) AVALON-TO-AXI4 BUS CONVERSION METHOD

(71) Applicant: INSPUR SUZHOU INTELLIGENT TECHNOLOGY CO., LTD., Jiangsu (CN)

(72) Inventors: Lei Guo, Jiangsu (CN); Jingdong Zhang, Jiangsu (CN); Jiangwei Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/780,190

(22) PCT Filed: Dec. 9, 2020

(86) PCT No.: PCT/CN2020/134718
§ 371 (c)(1),
(2) Date: May 26, 2022

(87) PCT Pub. No.: WO2021/169474
PCT Pub. Date: Sep. 2, 2021

(65) Prior Publication Data
US 2022/0414043 A1 Dec. 29, 2022

(30) Foreign Application Priority Data
Feb. 29, 2020 (CN) .......................... 202010132403.7

(51) Int. Cl.
*G06F 13/40* (2006.01)
*G06F 13/42* (2006.01)
(52) U.S. Cl.
CPC ...... *G06F 13/4013* (2013.01); *G06F 13/4239* (2013.01)

(58) Field of Classification Search
CPC ............. G06F 13/4013; G06F 13/4239; G06F 13/40–4018
(Continued)

(56) References Cited

U.S. PATENT DOCUMENTS 10,019,546 B1 7/2018 Stoler
10,833,679 B2 * 11/2020 Clark .................. G11C 7/1078
(Continued)

FOREIGN PATENT DOCUMENTS

| CN | 102880427 A | 1/2013 |
| CN | 103001827 A | 3/2013 |

(Continued)

OTHER PUBLICATIONS

Altera—"Avalon Bus Specification Version 2.3"; 106 Pages Dated Jul. 2003 (Year: 2003).*
(Continued)

*Primary Examiner* — Brian T Misiura
(74) *Attorney, Agent, or Firm* — Cooper Legal Group, LLC

(57) ABSTRACT

Disclosed is an Avalon-to-Axi4 bus conversion method, including: in case that an Avalon bus is an Avalon_st bus, receiving Avalon_st bus data, performing a logical process on the received Avalon_st bus data, and then outputting corresponding Axi4_st bus data; and in case that the Avalon bus is an Avalon_mm bus, receiving a signal transmitted by each channel of the Avalon_mm bus, framing and storing the signal in asynchronous First Input First Output (FIFO), and in case that a device corresponding to an Axi4 bus is ready, reading the signal from the asynchronous FIFO, and outputting the signal to a corresponding channel of the Axi4 bus according to a timing relationship of the Axi4 bus.

12 Claims, 4 Drawing Sheets

(58) Field of Classification Search
USPC .......................................................... 710/315
See application file for complete search history.

(56) References Cited

U.S. PATENT DOCUMENTS

| | | | | |
|---|---|---|---|---|
| 11,036,660 | B2* | 6/2021 | Ooi | ........................ H01L 23/538 |
| 11,301,415 | B2* | 4/2022 | Custodio | ............. G06F 15/7867 |
| 11,481,346 | B2* | 10/2022 | Li | ............................ G06F 13/38 |
| 2019/0138493 | A1 | 5/2019 | Teh et al. | |
| 2019/0303317 | A1 | 10/2019 | Rahman et al. | |

FOREIGN PATENT DOCUMENTS

| | | | |
|---|---|---|---|
| CN | 103744817 | A | 4/2014 |
| CN | 104750644 | A | 7/2015 |
| CN | 105183680 | A | 12/2015 |
| CN | 105279127 | A | 1/2016 |
| CN | 107852379 | A | 3/2018 |
| CN | 208820795 | U | 5/2019 |
| CN | 110399317 | A | 11/2019 |
| CN | 110545158 | A | 12/2019 |
| CN | 110545319 | A | 12/2019 |
| CN | 110704351 | A | 1/2020 |
| CN | 111414325 | A | 7/2020 |

OTHER PUBLICATIONS

International Search Report of corresponding PCT application No. PCT/CN2020/134718, dated Mar. 8, 2021, 5 pages.
Written Opinion of International Searching Authority of corresponding PCT application No. PCT/CN2020/134718, dated Mar. 8, 2021, 9 pages.
First Office Action of corresponding CN priority application No. CN202010132403.7, dated Mar. 25, 2021, 7 pages.
Yu, Zhibin "Design and Implementation of SOC Main Control System for LED Printer" 《Chinese Master's Theses Full-text Database (Electronic Journal)》 P35-46 with English abstract, 81 pages Apr. 30, 2018.
Supplementary European search report of corresponding European application No. 20922306.4, dated Nov. 10, 2022, 1 page.
European search opinion of corresponding European application No. 20922306.4, dated Nov. 10, 2022, 3 pages.
"AMM Master Bridge v1.0 LogiCORE IP Product Guide Vivado Design Suite Chapter 2: Product Specification Chapter 3: Designing with the Core", Apr. 4, 2018, pp. 1-32, XP055977173.
"AMM Slave Bridge v1.0 LogiCORE IP Product Guide Vivado Design Suite Chapter 2: Product Specification Chapter 3: Designing with the Core", Jul. 15, 2020, pp. 1-37, XP055977150.

* cited by examiner

AVALON-TO-AXI4 BUS CONVERSION METHOD

This application claims priority to Chinese Patent Application No. 202010132403.7, filed on Feb. 29, 2020, in China National Intellectual Property Administration and entitled "Avalon-to-Axi4 Bus Conversion Method", the contents of which are hereby incorporated by reference in its entirety.

FIELD

The present application relates to the technical field of data conversion, and particularly to an Avalon-to-Axi4 bus conversion method, as well as an Avalon-to-Axi4 bus conversion apparatus and device, and a computer-readable storage medium.

BACKGROUND

As an internal interconnect bus technology developed by Altera, an Avalon bus may be generated automatically by a QSYS tool without user interventions, and is usually regarded as an ideal internal interconnect bus between a system processor and a peripheral. In addition, the Avalon bus has the advantages that addresses, data, and control lines are independent, data widths within 128 bits and synchronous operations are supported, no complex handshaking/response mechanisms are needed, etc. Therefore, the Avalon bus is applied flexibly and extensively. As an on-chip bus proposed by AMBA for high performance, great bandwidth, and low latency, an Axi4 bus has the main characteristics that addresses/control and data are independent, unaligned data transmission is supported, meanwhile, data read and write channels are separated, and significant transmission access and out-of-order access are supported.

Currently, in most Field Programmable Gate Array (FPGA) engineering designs, interconnect buses are usually unified into a bus protocol, Avalon bus or Axi4 bus being the mainstream. Different interconnect buses are developed by use of different manufacturer chips and development tools. To make a design suitable for multiple platforms, a code module needs to consider two types of bus interfaces, while developing an interface supporting two types of buses may affect the development efficiency and speed seriously and prolong the research and development cycle of the product. Alternatively, when an existing function module is called across platforms, a code further needs to be modified for matching with a bus interface.

For the foregoing problems, the chip manufacturer Xilinx provided an Intellectual Property (IP) called amm_axi_bridge, thereby implementing conversion from an avalon_mm bus (a memory mapping mode of an Avalon bus) to an Axi4 bus. However, the IP only supports use on a platform of Xilinx, with a relatively long delay, and does not support cross-clock-domain conversion, so limitations in use are relatively severe.

In view of this, how to solve the foregoing technical problem has become a technical problem urgent to be solved by those skilled in the art.

SUMMARY

An object of the present application is to provide an Avalon-to-Axi4 bus conversion method. Cross-clock-domain conversion of Avalon bus to Axi4 bus may be implemented without any delay, and an interface may be designed and matched rapidly in a cross-platform universal design or code transplantation scheme. Another object of the present application is to provide an Avalon-to-Axi4 bus conversion apparatus and device, and a computer-readable storage medium, all of which have the foregoing technical effects.

In order to solve the foregoing technical problem, the present application provides an Avalon-to-Axi4 bus conversion method, including:

in case that an Avalon bus is an Avalon_st bus, receiving Avalon_st bus data, performing a logical process on the received Avalon_st bus data, and then outputting corresponding Axi4_st bus data; and in case that the Avalon bus is an Avalon_mm bus, receiving a signal transmitted by each channel of the Avalon_mm bus, framing and storing the signal in asynchronous First Input First Output (FIFO), and in case that a device corresponding to an Axi4 bus is ready, reading the signal from the asynchronous FIFO, and outputting the signal to a corresponding channel of the Axi4 bus according to a timing relationship of the Axi4 bus.

Optionally, the performing a logical process on the received Avalon_st bus data and then outputting corresponding Axi4_st bus data includes:

assigning values of a data packet end marker, data validity identifier, and device ready-state identifier in the Avalon_st bus data to corresponding interfaces of the Axi4_st bus;

performing high-low bit logic negation in units of bytes on data in the Avalon_st bus data, and then assigning a value to the corresponding interface of the Axi4_st bus; and obtaining a valid byte position based on an invalid byte position in the Avalon_st bus data, and assigning a value at the valid byte position to the corresponding interface of the Axi4_st bus.

Optionally, the signal transmitted by each channel of the Avalon_mm bus includes a read instruction, an address to be read, and a burst length, or a write instruction, an address to be written, and a burst length, or a write instruction, data to be written, and a burst length.

Optionally, the method further includes:

outputting a waitrequest signal to the Avalon_mm bus according to a depth parameter and data storage condition of the asynchronous FIFO.

Optionally, the method further includes:

modifying the depth parameter of the asynchronous FIFO.

In order to solve the foregoing technical problem, the present application provides an Avalon-to-Axi4 bus conversion apparatus, including:

an Avalon_st-to-Axi4_st bus conversion module, configured to, in case that an Avalon bus is an Avalon_st bus, receive Avalon_st bus data, perform a logical process on the received Avalon_st bus data, and then output corresponding Axi4_st bus data; and an Avalon_mm-to-Axi4 bus conversion module, configured to, in case that the Avalon bus is an Avalon_mm bus, receive a signal transmitted by each channel of the Avalon_mm bus, frame and store the signal in asynchronous First Input First Output (FIFO), and in case that a device corresponding to an Axi4 bus is ready, read the signal from the asynchronous FIFO, and output the signal to a corresponding channel of the Axi4 bus according to a timing relationship of the Axi4 bus.

Optionally, the apparatus further includes:

a feedback module, configured to output a waitrequest signal to the Avalon_mm bus according to a depth parameter and data storage condition of the asynchronous FIFO.

Optionally, the apparatus further includes:

a modification module, configured to modify the depth parameter of the asynchronous FIFO.

In order to solve the foregoing technical problem, the present application provides an Avalon-to-Axi4 bus conversion device, including:

a memory, configured to store a computer program; and
a processor, configured to execute the computer program to implement any steps of the Avalon-to-Axi4 bus conversion method as described above.

In order to solve the foregoing technical problem, the present application also provides a computer-readable storage medium, having a computer program stored thereon which, when executed by a processor, implements any steps of the Avalon-to-Axi4 bus conversion method as described above.

The Avalon-to-Axi4 bus conversion method provided in the present application includes: in case that an Avalon bus is an Avalon_st bus, receiving Avalon_st bus data, performing a logical process on the received Avalon_st bus data, and then outputting corresponding Axi4_st bus data; and in case that the Avalon bus is an Avalon_mm bus, receiving a signal transmitted by each channel of the Avalon_mm bus, framing and storing the signal in asynchronous FIFO, and in case that a device corresponding to an Axi4 bus is ready, reading the signal from the asynchronous FIFO, and outputting the signal to a corresponding channel of the Axi4 bus according to a timing relationship of the Axi4 bus.

It can be seen that, according to the Avalon-to-Axi4 bus conversion method provided in the present application, in case that the Avalon bus is the Avalon_st bus, the logical process is performed directly on the received Avalon_st bus data after the Avalon_st bus data is received, and then the corresponding Axi4_st bus data is output, thereby implementing delay-free conversion from the Avalon_st bus to the Axi4_st bus. In addition, in case that the Avalon bus is the Avalon_mm bus, the signal transmitted by each channel of the Avalon_mm bus is received and stored in the asynchronous FIFO, and when the device corresponding to the Axi4 bus is ready, the signal is read from the asynchronous FIFO and output, thereby implementing cross-clock-domain conversion of the Avalon_mm bus to the Axi4 bus. Meanwhile, only the Avalon bus is planned during cross-platform design, and when the Axi4 bus is needed, conversion from the Avalon bus to the Axi4 bus may be implemented by the method provided in the present application. Moreover, when an existing function code is called across platforms, implementing conversion of the Avalon bus to the Axi4 bus by the method provided in the present application may reduce interface debugging effectively, improve the development efficiency, and verify the performance of the function code in multiple platforms more efficiently.

All of the Avalon-to-Axi4 bus conversion apparatus and device, and computer-readable storage medium provided in the present application have the foregoing technical effects.

BRIEF DESCRIPTION OF THE DRAWINGS

In order to describe the technical solutions in embodiments of the present application more clearly, the drawings required to be used in the prior art and the embodiments will be briefly introduced below. Apparently, the drawings in the description below are only some embodiments of the present application. Those ordinarily skilled in the art may further obtain other drawings according to these drawings without creative work.

DETAILED DESCRIPTION

A core of the present application is to provide an Avalon-to-Axi4 bus conversion method. Cross-clock-domain conversion of Avalon bus to Axi4 bus may be implemented without any delay, and an interface may be designed and matched rapidly in a cross-platform universal design or code transplantation scheme. Another core of the present application is to provide an Avalon-to-Axi4 bus conversion apparatus and device, and a computer-readable storage medium, all of which have the foregoing technical effects.

In order to make the objectives, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
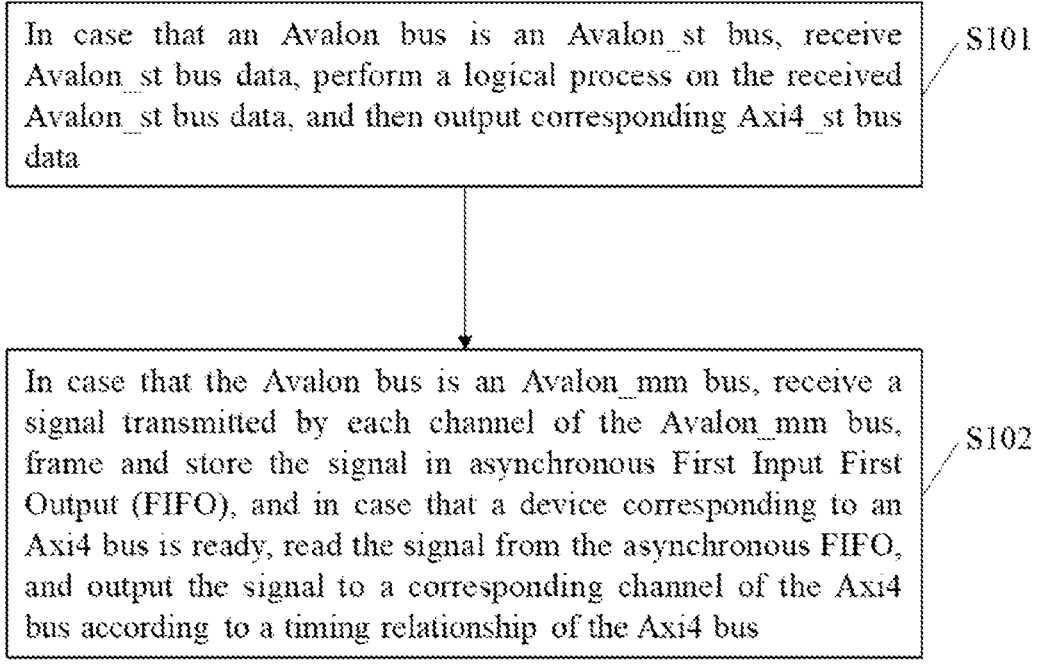
FIG. 1 is a schematic flowchart of an Avalon-to-Axi4 bus conversion method according to an embodiment of the present application.

Referring to FIG. 1, which is a schematic flowchart of an Avalon-to-Axi4 bus conversion method according to an embodiment of the present application; As shown in FIG. 1, the method includes the following steps.

S101: in case that an Avalon bus is an Avalon_st bus, receive Avalon_st bus data, perform a logical process on the received Avalon_st bus data, and then output corresponding Axi4_st bus data.

Specifically, this step aims to implement conversion from an Avalon_st bus to an Axi4_st bus. The Avalon_st bus refers to a streaming mode of the Avalon bus, and the Axi4_st bus refers to a streaming mode of the Axi4 bus. A controller, after receiving data of an Avalon_st bus protocol format, i.e., Avalon_st bus data, performs a logical process on the received Avalon_st bus data directly, and outputs data of an Axi4_st bus protocol format, i.e., Axi4_st bus data, thereby implementing delay-free conversion from the Avalon_st bus to the Axi4_st bus.

The operation of receiving Avalon_st bus data, performing a logical process on the received Avalon_st bus data, and then outputting corresponding Axi4_st bus data includes: assigning values of a data packet end marker, data validity identifier, and device ready-state identifier in the Avalon_st bus data to corresponding interfaces of the Axi4_st bus; performing high-low bit logic negation in units of bytes on data in the Avalon_st bus data, and then assigning a value to the corresponding interface of the Axi4_st bus; and obtaining a valid byte position based on an invalid byte position in the Avalon_st bus data, and assigning a value at the valid byte position to the corresponding interface of the Axi4_st bus.

Specifically, Avalon_st bus interface includes a data packet start marker (start of packet), a data channel (date), a data packet end marker (end of packet), an invalid byte position in data (empty), a data validity identifier (valid), and an identifier indicating whether a target device is ready (ready). An Axi4_st bus interface includes a data channel (date), a data validity identifier (valid), a valid data position (keep), a data packet end marker (last), and an identifier indicating whether a target device is ready (ready).

Comparison between the Avalon_st bus interface and the Axi4_st bus interface shows that the Avalon_st bus interface includes the data packet start marker, while the Axi4_st bus interface includes no data packet start marker, so the data packet start marker in the Avalon_st bus interface may not be processed. The data packet end marker in the Avalon_st bus interface has the same function as that in the Axi4_st bus interface, so a value of the data packet end marker in the Avalon_st bus interface is assigned to the data packet end marker in the Axi4_st bus interface. The data channels in the Avalon_st bus interface and the Axi4_st bus interface are opposite in input high-low bit logic, so high-low bit logic negation in units of bytes is performed on the Avalon_st bus data, and negated data is assigned to the data channel of the Axi4_st bus. That is, a value of a highest byte of the Avalon_st bus data is assigned to a lowest byte of the Axi4_st bus data, a value of a second highest byte of the Avalon_st bus data is assigned to a second lowest byte of the Axi4_st bus data, and other bytes are processed in the same manner, so as to complete conversion.

The Avalon_st bus interface includes the invalid byte position in data, while the Axi4_st bus interface includes the valid byte position in data. Therefore, the valid byte position is obtained first based on the invalid byte position in the Avalon_st bus data, and a value of the valid byte position is further assigned to the invalid byte position in the data in the Axi4_st bus interface. For example, if the empty of 64 bit data is 3'd0, indicating that invalid data is 0, the keep after conversion is 8'hff, also indicating that invalid data is 0. If the empty of 64 bit data is 3'd1, the keep after conversion is 8'h7f.

The data validity identifier in the Avalon_st bus interface has the same function as that in the Axi4_st bus interface, so a value of the data validity identifier in the Avalon_st bus interface is assigned to the data validity identifier in the Axi4_st bus interface. The identifier indicating that the target device is ready in the Avalon_st bus interface has the same function as that in the Axi4_st bus interface, so a value of the identifier indicating that the target device is ready in the Avalon_st bus interface is assigned to the identifier indicating that the target device is ready in the Axi4_st bus interface.

S102: in case that the Avalon bus is an Avalon_mm bus, receive a signal transmitted by each channel of the Avalon_mm bus, frame and store the signal in asynchronous First Input First Output (FIFO), and in case that a device corresponding to an Axi4 bus is ready, read the signal from the asynchronous FIFO, and output the signal to a corresponding channel of the Axi4 bus according to a timing relationship of the Axi4 bus.

Specifically, this step aims to implement conversion from an Avalon_mm bus to an Axi4 bus. The so-called Avalon_mm bus refers to a memory mapping mode of the Avalon bus. In the Avalon_mm bus, channels for read and write instructions and data to be read and written are separated, and an address bus is shared by read and write operations. The Axi4 bus includes five channels, i.e., an address read channel, a data read channel, an address write channel, a data write channel, and a write response channel respectively. The controller, after receiving a signal transmitted by each channel of the Avalon_mm bus, frames and stores the received signal in asynchronous FIFO first, and in case that a device corresponding to the Axi4 bus is ready, further reads the signal from the asynchronous FIFO, splits and recombines the signal, and outputs the signal to a corresponding channel of the Axi4 bus according to a timing relationship of the Axi4 bus.

Wherein, the signal transmitted by each channel of the Avalon_mm bus includes a read instruction, an address to be read, and a burst length, or a write instruction, an address to be written, and a burst length, or a write instruction, data to be written, and a burst length.

Figure 2:
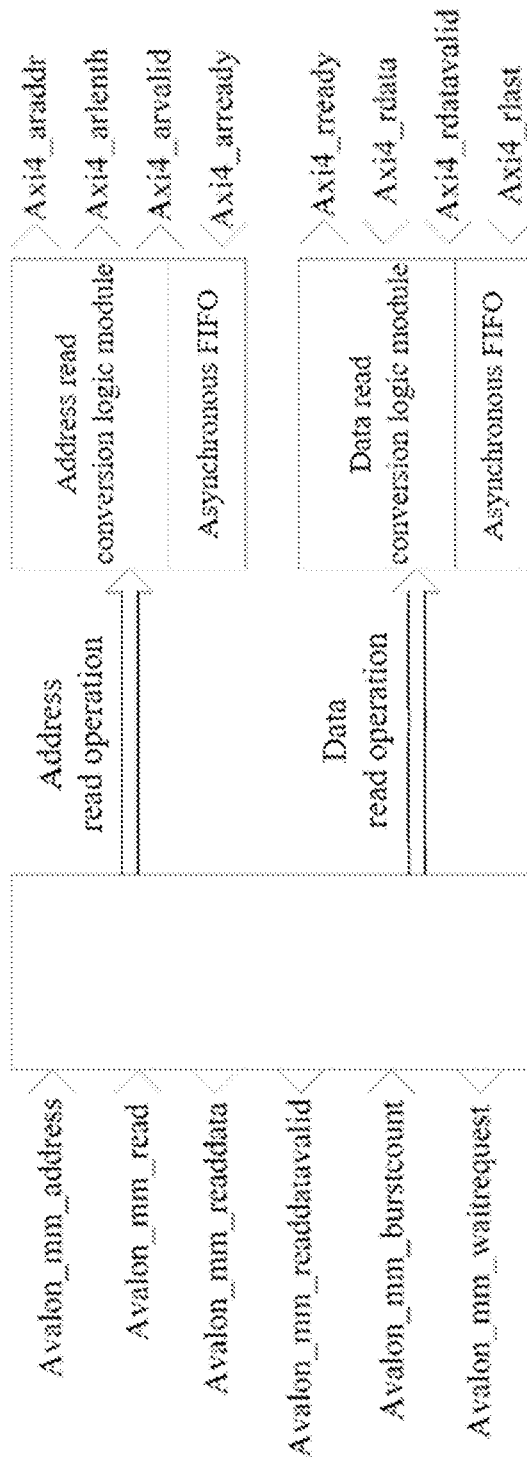
FIG. 2 is a schematic diagram of bus conversion under a read operation according to an embodiment of the present application.

Specifically, for bus conversion under an address read operation: referring to FIG. 2, the controller receives a read instruction (Avalon_mm_read), address to be read (Avalon_mm_address), and burst length (Avalon_mm_burstcount) of the Avalon_mm bus, frames, packs, and stores the read instruction, the address to be read, and the burst length in the asynchronous FIFO, reads a whole frame of data from the other end of the asynchronous FIFO according to a ready condition, i.e., arready condition, of a device receiving Axi4 data, splits and recombines the information according to a timing sequence of an Axi4 bus protocol, and further outputs a read instruction, address to be read, and burst length of the Axi4 bus. The burst length of the Avalon_mm bus and the burst length of the Axi4 bus have different meanings, and a value of the burst length of the Avalon_mm bus plus one is a value of the burst length of the Axi4 bus.

For bus conversion under a data read operation, referring to FIG. 2. The controller receives a signal of the Avalon_mm bus, such as a read instruction, frames, packs, and stores the read instruction, etc., in the asynchronous FIFO, reads a whole frame of data from the other end of the asynchronous FIFO according to a ready condition, i.e., arready condition, of a device receiving Axi4 data, splits and recombines the information according to a timing sequence of an Axi4 bus protocol, and further outputs a related instruction corresponding to the Axi4 bus. Further, the device corresponding to the Axi4 bus feeds back corresponding data to the controller after receiving an address to be read, a burst length, and other information. The controller further frames and stores the data and the instruction in the asynchronous FIFO according to a signal relationship of axi4_rdata, axi4_rdatavalid, and axi4_rlast, further reads the data from the asynchronous FIFO according to a timing relationship of the Avalon_mm bus, and feeds back the data to readdata and readdatavalid channels of the Avalon_mm bus.

Figure 3:
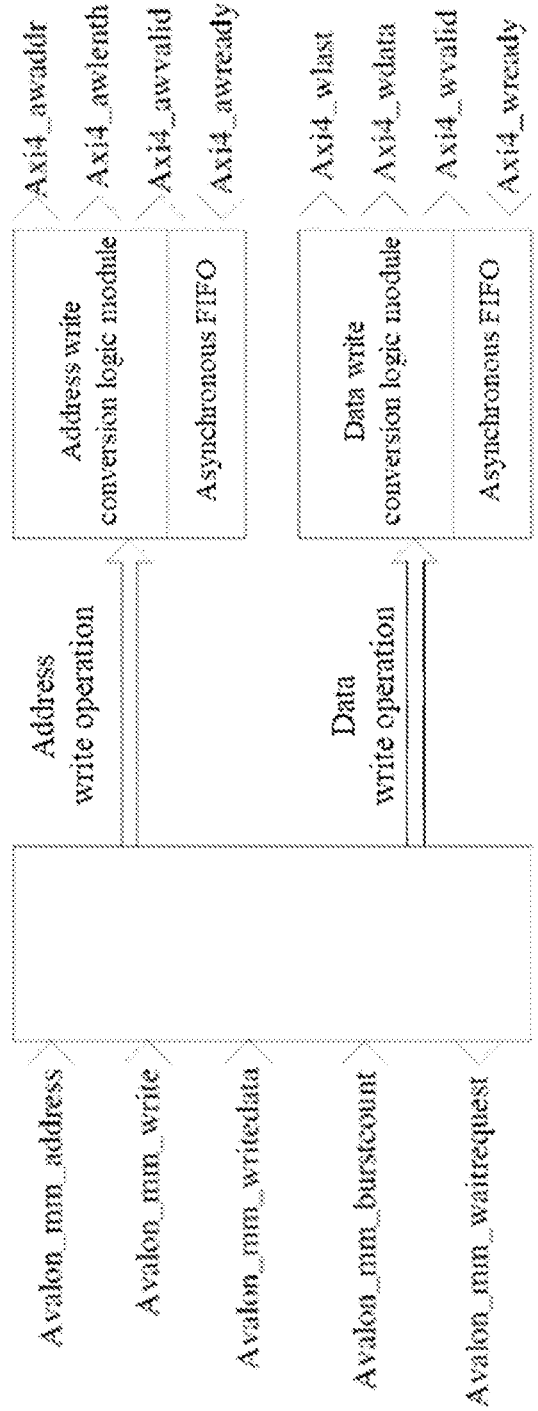
FIG. 3 is a schematic diagram of bus conversion under a write operation according to an embodiment of the present application.

Specifically, bus conversion under an address write operation refers to FIG. 3. A write instruction (Avalon_mm_write), address to be written (Avalon_mm_address), and burst length (Avalon_mm_burstcount) of the Avalon_mm bus are received. The read instruction, the address to be read, and the burst length are framed, packed, and stored in the asynchronous FIFO. A whole frame of data is read from the other end of the asynchronous FIFO according to a ready condition of a device receiving Axi4 data. The information is split and recombined according to a timing sequence of an Axi4 bus protocol. A write instruction (Axi4_awvalid), address to be written (Axi4_awaddr), and burst length (Axi4_awlength) of the Axi4 bus are further output.

Specifically, for bus conversion under a data write operation, referring to FIG. 3. A write instruction, data to be written (Avalon_mm_writedata), and burst length of the Avalon_mm bus are received. The write instruction, the data to be written, and the burst length are framed, packed, and stored in the asynchronous FIFO. A whole frame of data is read from the other end of the asynchronous FIFO according to a ready condition of a device receiving Axi4 data and a received awready condition. The information is split and recombined according to a timing sequence of an Axi4 bus protocol. A write instruction, data to be written, and burst length of the Axi4 bus are further output.

Configurations of other interfaces of the Axi4 bus will not be elaborated and limited in the present application again, and may be made correspondingly as practically required. In addition, the controller further receives write response information of a corresponding peripheral, and receives a completion signal of a write signal. Moreover, the controller further has a fault-tolerant mechanism so as to process part of error or timing-disordered bus data to ensure a normal state of valid data. For example, when an avalon_ready signal is pulled down, an avalon_valid signal needs to be kept in an original state without jumping. However, in practice, normal sending and reception of the data may not be affected no matter whether the avalon_valid signal jumps or not. Therefore, when ready is in a low level, even if the avalon_valid signal jumps, the controller may accept, and the data may continue to be sent and received normally. As such, bus conversion is implemented.

Further, based on the above-mentioned embodiment, the method may further include:

outputting a waitrequest signal to the Avalon_mm bus according to a depth parameter and data storage condition of the asynchronous FIFO.

Specifically, in the present embodiment, the controller, based on receiving an address, data, and burst length of the Avalon_mm bus and framing and storing the address, data, and burst length in the asynchronous FIFO, further outputs a waitrequest signal to the Avalon_mm bus according to a depth parameter and data storage condition, i.e., whether the asynchronous FIFO is full, of the asynchronous FIFO, so as to notify the corresponding device to wait or continue transmitting the data.

Further, based on the above-mentioned embodiment, the method may further include: modifying the depth parameter of the asynchronous FIFO.

Specifically, deep applications of the asynchronous FIFO under different working conditions are different. In order to meet requirements of different working conditions better, the depth parameter of the asynchronous FIFO may further be modified to avoid influences on the conversion speed and efficiency after the asynchronous FIFO is full. For example, for a fast-in slow-out working condition, the depth parameter of the asynchronous FIFO may be modified into a relatively small value.

It can be seen that, according to the Avalon-to-Axi4 bus conversion method provided in the present application, in case that the Avalon bus is the Avalon_st bus, the logical process is performed directly on the received Avalon_st bus data after the Avalon_st bus data is received, and then the corresponding Axi4_st bus data is output, thereby implementing delay-free conversion from the Avalon_st bus to the Axi4_st bus. In addition, in case that the Avalon bus is the Avalon_mm bus, the signal transmitted by each channel of the Avalon_mm bus is received and stored in the asynchronous FIFO, and when the device corresponding to the Axi4 bus is ready, the signal is read from the asynchronous FIFO and output, thereby implementing cross-clock-domain conversion of the Avalon_mm bus to the Axi4 bus. Meanwhile, only the Avalon bus is planned during cross-platform design, and when the Axi4 bus is needed, conversion from the Avalon bus to the Axi4 bus may be implemented by the method provided in the present application. Moreover, when an existing function code is called across platforms, implementing conversion of the Avalon bus to the Axi4 bus by the method provided in the present application may reduce interface debugging effectively, improve the development efficiency, and verify the performance of the function code in multiple platforms more efficiently.

Figure 4:
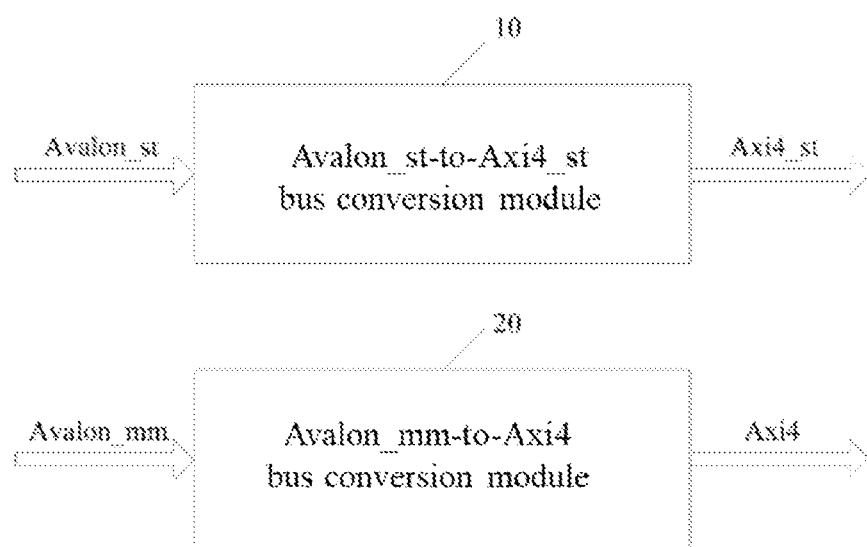
FIG. 4 is a schematic diagram of an Avalon-to-Axi4 bus conversion apparatus according to an embodiment of the present application.

The present application also provides an Avalon-to-Axi4 bus conversion apparatus. The apparatus described below and the method described above may correspondingly refer to each other. As shown in FIG. 4, the apparatus includes:

an Avalon_st-to-Axi4_st bus conversion module 10, configured to, in case that an Avalon bus is an Avalon_st bus, receive Avalon_st bus data, perform a logical process on the received Avalon_st bus data, and then output corresponding Axi4_st bus data; and an Avalon_mm-to-Axi4 bus conversion module 20, configured to, in case that the Avalon bus is an Avalon_mm bus, receive a signal transmitted by each channel of the Avalon_mm bus, frame and store the signal in asynchronous First Input First Output (FIFO), and in case that a device corresponding to an Axi4 bus is ready, read the signal from the asynchronous FIFO, and output the signal to a corresponding channel of the Axi4 bus according to a timing relationship of the Axi4 bus.

Based on the above-mentioned embodiment, optionally, the AAvalon_st-to-Axi4_st bus conversion module 10 is specifically configured to assign values of a data packet end marker, data validity identifier, and device ready-state identifier in the Avalon_st bus data to corresponding interfaces of the Axi4_st bus; perform high-low bit logic negation in units of bytes on data in the Avalon_st bus data, and then assign a value to the corresponding interface of the Axi4_st bus; and obtain a valid byte position based on an invalid byte position in the Avalon_st bus data, and assign a value at the valid byte position to the corresponding interface of the Axi4_st bus.

Based on the above-mentioned embodiment, optionally, the apparatus further includes:

a feedback module, configured to output a waitrequest signal to the Avalon_mm bus according to a depth parameter and data storage condition of the asynchronous FIFO.

Based on the above-mentioned embodiment, optionally, the apparatus further includes:

a modification module, configured to modify the depth parameter of the asynchronous FIFO.

The present application also provides an Avalon-to-Axi4 bus conversion device, including a memory and a processor. The memory is configured to store a computer program and the processor is configured to execute the computer program to implement the following steps:

in case that an Avalon bus is an Avalon_st bus, receiving Avalon_st bus data, performing a logical process on the received Avalon_st bus data, and then outputting corresponding Axi4_st bus data; and in case that the Avalon bus is an Avalon_mm bus, receiving a signal transmitted by each channel of the Avalon_mm bus, framing and storing the signal in asynchronous FIFO, and in case that a device corresponding to an Axi4 bus is ready, reading the signal from the asynchronous FIFO, and outputting the signal to a corresponding channel of the Axi4 bus according to a timing relationship of the Axi4 bus.

Introductions about the device provided in the present application refer to the method embodiment, and elaborations are omitted in the present application.

The present application also provides a computer-readable storage medium, having a computer program stored thereon which, when executed by a processor, may implement the following steps:

in case that an Avalon bus is an Avalon_st bus, receiving Avalon_st bus data, performing a logical process on the received Avalon_st bus data, and then outputting corresponding Axi4_st bus data; and in case that the Avalon bus is an Avalon_mm bus, receiving a signal transmitted by each channel of the Avalon_mm bus, framing and storing the signal in asynchronous FIFO, and in case that a device corresponding to an Axi4 bus is ready, reading the signal from the asynchronous FIFO, and outputting the signal to a corresponding channel of the Axi4 bus according to a timing relationship of the Axi4 bus.

The computer-readable storage medium may include various media capable of storing program codes, such as a U disk, a mobile hard disk, a Read-Only Memory (ROM), a Random Access Memory (RAM), a magnetic disk, or an optical disk.

Introductions about the computer-readable storage medium provided in the present application refer to the method embodiment, and elaborations are omitted in the present application.

Each embodiment in the specification is described progressively. Descriptions made in each embodiment focus on differences with the other embodiments, and the same or similar parts in each embodiment refer to the other embodiments. The apparatus, device, and computer-readable Storage medium disclosed in the embodiments correspond to the method disclosed in the embodiments, and thus are described relatively briefly, and related parts refer to the descriptions about the method.

Those skilled in the art may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been described generally in the foregoing descriptions according to functions. Whether these functions are executed by hardware or software depends on specific applications and design constraints of the technical solutions. Those skilled in the art may realize the described functions for each specific application by different methods, but such realization shall fall within the scope of the present application.

The steps of the method or algorithm described in combination with the embodiments disclosed herein may directly be implemented by hardware, a software module executed by the processor, or a combination thereof. The software module may be arranged in a RAM, a memory, a ROM, an electrically programmable ROM, an electrically erasable programmable ROM, a register, a hard disk, a removable disk, a Compact Disc Read-Only Memory (CD-ROM), or a Storage medium in any other form well known in this art.

The technical solutions provided in the present application are introduced above in detail. The principle and implementation modes of the present application are described herein with specific examples, and the descriptions about the above embodiments are only for helping in understanding the method and core idea of the present application. It is to be pointed out that those ordinarily skilled in the art may further make a plurality of improvements and modifications to the present application without departing from the principle of the present application, and these improvements and modifications shall also fall within the scope of protection of the claims of the present application.

The invention claimed is:

1. An Avalon-to-Axi4 bus conversion method, comprising:
   in case that an Avalon bus is a streaming mode of the Avalon bus (Avalon_st bus), receiving Avalon_st bus data, performing a logical process on the Avalon_st bus data, and then outputting corresponding streaming mode of an Axi4 bus (Axi4_st bus) data; and
   in case that the Avalon bus is a memory mapping mode of the Avalon bus (Avalon_mm bus), receiving a signal transmitted by each channel of the Avalon_mm bus, framing and storing the signal in asynchronous First Input First Output (FIFO), and in case that a device corresponding to an Axi4 bus is ready, reading the signal from the asynchronous FIFO, and outputting the signal to a corresponding channel of the Axi4 bus according to a timing relationship of the Axi4 bus;
   wherein the performing a logical process on the Avalon_st bus data and then outputting the corresponding streaming mode of the Axi4_st bus data comprises:
      assigning values of a data packet end marker, data validity identifier, and device ready-state identifier in the Avalon_st bus data to corresponding interfaces of an Axi4_st bus;
      performing high-low bit logic negation in units of bytes on data in the Avalon_st bus data, and then assigning a value to the corresponding interface of the Axi4_st bus; and
      obtaining a valid byte position based on an invalid byte position in the Avalon_st bus data, and assigning a value at the valid byte position to the corresponding interface of the Axi4_st bus.

2. The Avalon-to-Axi4 bus conversion method according to claim 1, wherein the signal transmitted by each channel of the Avalon_mm bus comprises a read instruction, an address to be read, and a burst length, or comprises a write instruction, an address to be written, and a burst length, or comprises a write instruction, data to be written, and a burst length.

3. The Avalon-to-Axi4 bus conversion method according to claim 1, further comprising:
   outputting a waitrequest signal to the Avalon_mm bus according to a depth parameter and data storage condition of the asynchronous FIFO.

4. The Avalon-to-Axi4 bus conversion method according to claim 3, further comprising:
   modifying the depth parameter of the asynchronous FIFO.

5. An Avalon-to-Axi4 bus conversion device, comprising:
   a memory, configured to store a computer program; and
   a processor, configured to execute the computer program to implement any steps of an Avalon-to-Axi4 bus conversion method, wherein the Avalon-to-Axi4 bus conversion method comprises:
   in case that an Avalon bus is a streaming mode of the Avalon bus (Avalon_st bus), receiving Avalon_st bus data, performing a logical process on the Avalon_st bus data, and then outputting corresponding streaming mode of an Axi4 bus (Axi4_st bus) data; and
   in case that the Avalon bus is a memory mapping mode of the Avalon bus (Avalon_mm bus), receiving a signal transmitted by each channel of the Avalon_mm bus, framing and storing the signal in asynchronous First Input First Output (FIFO), and in case that a device corresponding to an Axi4 bus is ready, reading the signal from the asynchronous FIFO, and outputting the signal to a corresponding channel of the Axi4 bus according to a timing relationship of the Axi4 bus;
   wherein the performing a logical process on the Avalon_st bus data and then outputting the corresponding streaming mode of the Axi4_st bus data comprises:

assigning values of a data packet end marker, data validity identifier, and device ready-state identifier in the Avalon_st bus data to corresponding interfaces of an Axi4_st bus;

performing high-low bit logic negation in units of bytes on data in the Avalon_st bus data, and then assigning a value to the corresponding interface of the Axi4_st bus; and obtaining a valid byte position based on an invalid byte position in the Avalon_st bus data, and assigning a value at the valid byte position to the corresponding interface of the Axi4_st bus.

6. The Avalon-to-Axi4 bus conversion device according to claim 5, wherein the signal transmitted by each channel of the Avalon_mm bus comprises a read instruction, an address to be read, and a burst length, or comprises a write instruction, an address to be written, and a burst length, or comprises a write instruction, data to be written, and a burst length.

7. The Avalon-to-Axi4 bus conversion device according to claim 5, wherein the Avalon-to-Axi4 bus conversion method further comprises:

outputting a waitrequest signal to the Avalon_mm bus according to a depth parameter and data storage condition of the asynchronous FIFO.

8. The Avalon-to-Axi4 bus conversion device according to claim 7, wherein the Avalon-to-Axi4 bus conversion method further comprises:

modifying the depth parameter of the asynchronous FIFO.

9. A non-transitory computer-readable storage medium, having a computer program stored thereon which, when executed by a processor, implements any steps of an Avalon-to-Axi4 bus conversion method, wherein the Avalon-to-Axi4 bus conversion method comprises:

in case that an Avalon bus is a streaming mode of the Avalon bus (Avalon_st bus), receiving Avalon_st bus data, performing a logical process on the Avalon_st bus data, and then outputting corresponding streaming mode of an Axi4 bus (Axi4_st bus) data; and in case that the Avalon bus is a memory mapping mode of the Avalon bus (Avalon_mm bus), receiving a signal transmitted by each channel of the Avalon_mm bus, framing and storing the signal in asynchronous First Input First Output (FIFO), and in case that a device corresponding to an Axi4 bus is ready, reading the signal from the asynchronous FIFO, and outputting the signal to a corresponding channel of the Axi4 bus according to a timing relationship of the Axi4 bus;

wherein the performing a logical process on the Avalon_st bus data and then outputting the corresponding streaming mode of the Axi4_st bus data comprises:

assigning values of a data packet end marker, data validity identifier, and device ready-state identifier in the Avalon_st bus data to corresponding interfaces of an Axi4_st bus;

performing high-low bit logic negation in units of bytes on data in the Avalon_st bus data, and then assigning a value to the corresponding interface of the Axi4_st bus; and obtaining a valid byte position based on an invalid byte position in the Avalon_st bus data, and assigning a value at the valid byte position to the corresponding interface of the Axi4_st bus.

10. The non-transitory computer-readable storage medium according to claim 9, wherein the signal transmitted by each channel of the Avalon_mm bus comprises a read instruction, an address to be read, and a burst length, or comprises a write instruction, an address to be written, and a burst length, or comprises a write instruction, data to be written, and a burst length.

11. The non-transitory computer-readable storage medium according to claim 9, wherein the Avalon-to-Axi4 bus conversion method further comprises:

outputting a waitrequest signal to the Avalon_mm bus according to a depth parameter and data storage condition of the asynchronous FIFO.

12. The non-transitory computer-readable storage medium according to claim 11, wherein the Avalon-to-Axi4 bus conversion method further comprises:

modifying the depth parameter of the asynchronous FIFO.

* * * * *